(12) United States Patent
Lu et al.

(10) Patent No.: US 12,135,648 B2
(45) Date of Patent: Nov. 5, 2024

(54) DATA PREFETCHING METHOD AND APPARATUS, AND STORAGE DEVICE

(71) Applicant: HUAWEI TECHNOLOGIES CO., LTD., GuangDong (CN)

(72) Inventors: Peng Lu, Johannesburg (ZA); Jinhu Liu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 22 days.

(21) Appl. No.: 17/951,424

(22) Filed: Sep. 23, 2022

(65) Prior Publication Data

US 2023/0009375 A1   Jan. 12, 2023

Related U.S. Application Data

(63) Continuation of application No. PCT/CN2021/082382, filed on Mar. 23, 2021.

(30) Foreign Application Priority Data

Mar. 23, 2020 (CN) .......................... 202010209712.X

(51) Int. Cl.
*G06F 12/08* (2016.01)
*G06F 12/0862* (2016.01)
*G06N 5/04* (2023.01)

(52) U.S. Cl.
CPC .......... *G06F 12/0862* (2013.01); *G06N 5/04* (2013.01); *G06F 2212/602* (2013.01)

(58) Field of Classification Search
CPC .. G06F 2212/602; G06F 12/0862; G06N 5/04
See application file for complete search history.

(56) References Cited

U.S. PATENT DOCUMENTS

| | | | |
|---|---|---|---|
| 10,437,718 B1 | 10/2019 | Anghel et al. | |
| 2012/0096227 A1* | 4/2012 | Dubrovin | G06F 12/0862 711/E12.001 |
| 2019/0129834 A1* | 5/2019 | Purkayastha | G06N 20/00 |
| 2019/0243695 A1 | 8/2019 | Mittal et al. | |
| 2019/0317901 A1* | 10/2019 | Kachare | G06F 3/064 |

(Continued)

FOREIGN PATENT DOCUMENTS

| | | |
|---|---|---|
| CN | 1961286 A | 5/2007 |
| CN | 101470619 A | 7/2009 |

(Continued)

OTHER PUBLICATIONS

Semiconductor Industry Watch, "Jeff Dean talks about the future of AI chips", https://zhuanlan.zhihu.com/p/98753249, Published on Dec. 22, 2019, 13:21, with an English machine translation; 18 total pages.

(Continued)

*Primary Examiner* — Jae U Yu
(74) *Attorney, Agent, or Firm* — Rimon PC

(57) ABSTRACT

A data prefetching method and apparatus, and related storage device are provided. Data samples are collected. An AI chip trains the data samples to obtain a prefetching model. The AI chip then sends the prefetching model to a processor. The processor reads to-be-read data into a cache based on the prefetching model to reduce the computing burden of the processor.

14 Claims, 2 Drawing Sheets

(56) References Cited

U.S. PATENT DOCUMENTS

| | | | | |
|---|---|---|---|---|
| 2019/0332525 A1* | 10/2019 | Anghel | .................... | G06N 3/08 |
| 2019/0361811 A1 | 11/2019 | Saeki et al. | | |
| 2019/0391920 A1* | 12/2019 | Gupta | ................. | G06F 12/0862 |
| 2020/0019506 A1* | 1/2020 | Ray | .................... | G06F 12/0871 |
| 2020/0334155 A1* | 10/2020 | Alshawabkeh | ..... | G06F 12/0862 |
| 2020/0372163 A1* | 11/2020 | Chung | ................. | G06F 3/0658 |
| 2021/0011726 A1* | 1/2021 | Alam | ................. | G06F 9/30047 |
| 2023/0071111 A1* | 3/2023 | BenHanokh | ........ | G06F 12/0862 |

FOREIGN PATENT DOCUMENTS

| | | | |
|---|---|---|---|
| CN | 103324585 A | 9/2013 |
| CN | 105955709 A | 9/2016 |
| CN | 109564552 A | 4/2019 |
| CN | 110018970 A | 7/2019 |
| CN | 110321306 A | 10/2019 |
| CN | 110389909 A | 10/2019 |
| CN | 110765034 A | 2/2020 |

OTHER PUBLICATIONS

Milad Hashem! et al: "Learning Memory Access Patterns", XP080858418, Mar. 6, 2018, total 15 pages.

Binny S Gill et al: "Optimal multistream sequential prefetching in a shared cache", XP058347355, 2007 ACM, Total 27 Pages.

\* cited by examiner

DATA PREFETCHING METHOD AND APPARATUS, AND STORAGE DEVICE

CROSS-REFERENCE TO RELATED APPLICATIONS

This application is a continuation of International Application No. PCT/CN2021/082382, filed on Mar. 23, 2021, which claims priority to Chinese Patent Application No. 202010209712.X filed on Mar. 23, 2020, both of which are hereby incorporated by reference in their entireties.

TECHNICAL FIELD

This application relates to the field of storage technologies, and in particular, to a data prefetching method and apparatus, and related storage device.

BACKGROUND

In a storage device, the access speed of a cache is higher than that of a hard disk. Therefore, in applications, when a data read request is received, the data to be read next may be predicted for the next data read request based on the received data read request, and the predicted data can be read in advance from the hard disk into the cache. In this way, when receiving a data read request, the storage device may implement read hit in the cache, thereby greatly improving a processing speed of the data read request.

However, a processing capability of a processor is limited, and prefetching algorithms are usually complicated, and computing power of the processor has become insufficient. In conclusion, the limited computing power of processors has become a bottleneck in development of prefetching algorithms.

SUMMARY

This application provides a data prefetching method and apparatus, and related storage device, to save processor computing power. The technical solutions are as follows:

According to a first aspect, a data prefetching method is provided and is applied to a storage device. The storage device includes a processor, an artificial intelligence (AI) chip, a level-1 storage, and a level-2 storage. In the data prefetching method, the AI chip generates a prefetching model; the AI chip sends the generated prefetching model to the processor; the processor predicts to-be-read data based on the prefetching model, where the to-be-read data is stored in the level-2 storage; and the processor reads the to-be-read data from the level-2 storage into the level-1 storage.

The first aspect may be applied to any application scenario that includes two levels of storage. The level-1 storage refers to storage that has a smaller capacity and a higher data processing speed, for example, a cache, a level-1 memory, a level-2 memory, or a memory in a disk enclosure. The level-2 storage refers to storage that has a larger capacity and a lower data processing speed relative to the level-1 storage, for example, a level-2 memory or a hard disk.

Example 1: The level-1 storage refers to the cache inside a controller 11; the level-2 storage refers to the hard disk in the disk enclosure coupled to the controller 11; and data prefetching means that data in the hard disk is read into the cache in advance for reading by a host.

Example 2: The level-1 storage is a level-1 memory, and is also referred to as a CPU cache (cache memory), and is temporary storage closest to the processor; the level-2 storage is a level-2 memory, and is usually directly referred to as a memory; and data prefetching means that data in the level-2 memory is read into the level-1 memory in advance.

Example 3: The level-1 storage refers to the level-2 memory described above; the level-2 storage refers to the hard disk; and data prefetching means that the data in the hard disk is read into the level-2 memory in advance.

Example 4: The level-1 storage refers to the memory in the disk enclosure; the level-2 storage refers to the hard disk in the disk enclosure; and data prefetching means that the data in the hard disk is read into the memory in the disk enclosure in advance.

In some embodiments of this application, the AI chip trains a data sample to generate the prefetching model, and the processor only needs to perform a data prefetching operation, thereby greatly reducing a computing load of the processor.

Optionally, the step that the processor predicts to-be-read data based on the prefetching model includes: performing inference based on the prefetching model and a received data read request, to obtain an address of the predicted to-be-read data.

Optionally, the AI chip periodically upgrades the prefetching model.

Optionally, the prefetching model includes but is not limited to a serial sequential stream model, a parallel sequential stream model, a spaced sequential stream model, and an associated prefetching model.

According to a second aspect, a data prefetching method is provided, and the method is applied to a storage device. The storage device includes a processor, an AI chip, a level-1 storage, and a level-2 storage. The method includes: the AI chip generates a prefetching model; the AI chip performs inference based on the prefetching model and a received data read request, to obtain an address of to-be-read data; the AI chip sends the address of the to-be-read data to the processor; and the processor reads the to-be-read data from the level-2 storage into the level-1 storage based on the address of the to-be-read data.

Optionally, the method further includes: The AI chip periodically upgrades the prefetching model.

Optionally, the prefetching model includes but is not limited to a serial sequential stream model, a parallel sequential stream model, a spaced sequential stream model, and an associated prefetching model.

According to a third aspect, a storage device is provided. The storage device includes a processor, an artificial intelligence (AI) chip, a cache, and a hard disk. The storage device is configured to perform the method provided in the first aspect or the second aspect.

According to a fourth aspect, a data prefetching apparatus is provided. The apparatus includes a first processing module and a second processing module. The data prefetching apparatus is configured to perform the method provided in the first aspect or the second aspect.

According to a fifth aspect, a terminal device is provided. The terminal device includes a level-1 storage, a level-2 storage, a first processing module, and a second processing module. The first processing module is configured to train a data sample to generate a prefetching model and send the generated prefetching model to the second processing module. The second processing module is configured to: predict to-be-read data based on the prefetching model, where the to-be-read data is stored in the level-2 storage; and read the to-be-read data from the level-2 storage into the level-1 storage.

DESCRIPTION OF EMBODIMENTS

To make the objectives, technical solutions, and advantages of this application clearer, the following further describes implementations of this application in detail with reference to the accompanying drawings.

The technical solutions according to embodiments of the present disclosure are clearly and described in the following with reference to the accompanying drawings.

Figure 1:
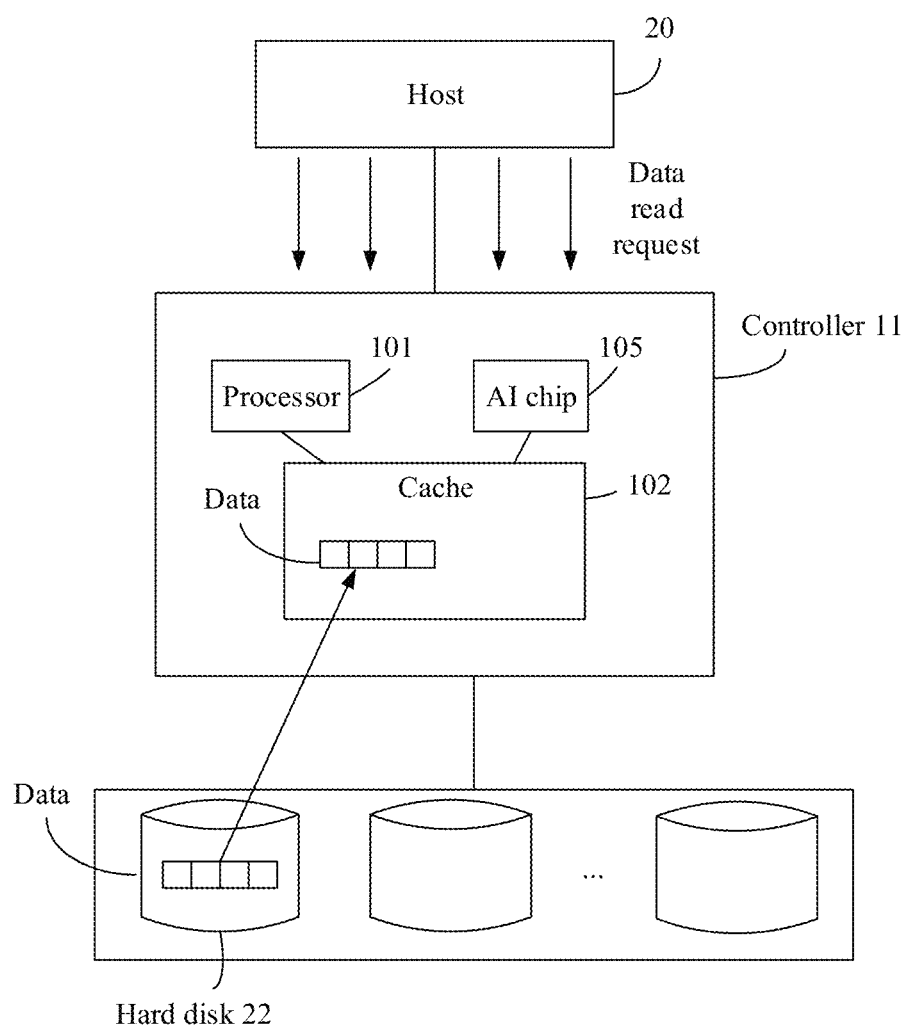
FIG. 1 is a schematic diagram of a storage device in a data prefetching method according to an embodiment of this application.

FIG. 1 is an architectural diagram of a system according to an embodiment of the present disclosure. A storage system provided in this embodiment includes a host 20, a controller 11, and a plurality of hard disks 22. The host 20 communicates with the controller 11 through a network file system (NFS)/common internet file system (CIFS) protocol or a fiber channel (FC) protocol. Specifically, the host 20 may send a data write request to the controller 11. After receiving the data write request, the controller 11 writes, in the hard disk 22, data carried in the data write request. In addition, the host 20 may further send a data read request to the controller 11. After receiving the data read request, the controller 11 searches a cache 102 of the controller 11 based on an address in the data read request to determine whether the to-be-read data is stored in the cache 102, and if the to-be-read data is stored in the cache 102, directly sends the to-be-read data to the host 20, and if the to-be-read data is not stored in the cache 102, obtains the data from the hard disk 22 and sends the data to the host 20. During actual application, the controller 11 and the hard disk 22 may be integrated into a storage device, or may be located in two devices independent of each other. A location relationship between the controller 11 and the hard disk 22 is not limited in the present disclosure.

Using a data read request as an example, when a user initiates a large data read request on the host 20 or a client connected to the host 20, the host 20 usually splits the data read request into a plurality of requests and sends the plurality of requests to the controller 11 for processing. The operation of splitting the data read request into a plurality of requests may be performed by a host bus adapter (HBA) in the host 20, or may be performed by an HBA in the controller 11. The requests after splitting may be the same or different in size. A size of a data read request after splitting is not limited in the present application. In addition, logical addresses of the plurality of data read requests after splitting may be consecutive. The plurality of data read requests with the consecutive logical addresses are referred to as a sequential stream. The host 20 may send the plurality of data read requests in the sequential stream to the controller 11 for processing in serial mode, or may send the plurality of data read requests in the sequential stream to the controller 11 for processing in parallel mode. The sequential stream sent serially to the controller 11 for processing is referred to as a serial sequential stream, and the sequential stream sent in parallel to the controller 11 for processing is referred to as a parallel sequential stream. For the serial sequential stream, the host 20 sequentially sends each of the plurality of consecutive data read requests to the controller 11, and sends a next data read request after processing of a previous data read request is completed. For the parallel sequential stream, the host 20 sends at least two data read requests of the plurality of consecutive data read requests to the controller 11, and the storage device may process the at least two data read requests in parallel. In one example, the host 20 sends nine data read requests to the controller 11. If the nine data read requests are processed serially, the host 20 first sends a first data read request, then, sends a second data read request after receiving a response request of the first data read request, then, sends a third data read request after receiving a response request of the second data read request, and so on, until all the nine data read requests are processed. If the nine data read requests are processed in parallel, the host 20 may simultaneously send the first data read request, the second data read request, and the third data read request to the controller 11. The controller 11 processes the three data read requests in parallel. When processing of the first data read request is completed, the host 20 may send a fourth data read request to the controller 11 even if processing of the second data read request or the third data read request is not completed, and so on, until all the nine data read requests are processed. A spaced sequential stream means that a rule exists among several spaced data read requests.

As shown in FIG. 1, the controller 11 provided in some embodiments includes at least a processor 101, an artificial intelligence (AI) chip 105, and a cache 102.

The processor 101 is a central processing unit (CPU). In an embodiment of the present disclosure, the processor 101 may be configured to receive data from the host 20, and store the data in the cache 102 or the hard disk 22. In addition, the processor 101 is further configured to predict to-be-read data based on a data prefetching model, and store the to-be-read data in the cache 102 in advance.

The AI chip 105 is configured to obtain a data sample, and perform model training on the data sample to obtain a prefetching model. Then, the AI chip 102 sends the prefetching model to the processor 101. A form of the AI chip 105 may be a chip or another physical component, for example, may be a training chip used for constructing a neural network model, or may be an inference chip that performs inference by using a neural network model.

The AI chip 21 communicates with the processor 101 by using a high-speed interconnect network. The high-speed interconnect network is used for data communication between the AI chip 21 and the processor 101. The high-speed interconnect network 22 may be any one of PCIE, a memory fabric, the high-speed Ethernet, an HCCS, an infiniband (IB), or a fiber channel (FC). The high-speed interconnect network 22 may be in a form of a bus. In this case, the high-speed interconnect network 22 may also be referred to as a high-speed interconnect switch or a high-speed interconnect bus. For example, the controller 11 may include a high-speed interconnect bus, and the AI chip 21 and the processor 101 may be connected to the high-speed interconnect bus, to access the high-speed interconnect network. In some possible embodiments, the AI chip 21 may include a high-speed interconnect network interface, the processor 101 may include a high-speed interconnect network interface, the AI chip 21 is connected to the high-speed interconnect bus through the high-speed interconnect network interface of the AI chip 21, and the processor 101 is connected to the high-speed interconnect bus through the high-speed interconnect network interface of the processor 101. The high-speed interconnect network interface may be a serial bus interface. Specifically, the high-speed interconnect network interface may be any one of a PCIE interface, an HCCS interface, an Ethernet interface, an IB interface, or an FC interface. If types of high-speed interconnect network interfaces are different, speeds of transmitting service data between the AI chip 21 and the processor 101 may also be different. It should be understood that the high-speed interconnect bus is merely an example of the high-speed interconnect network 22. The high-speed interconnect network 22 may not be limited to the high-speed interconnect bus, for example, may be a different bus having a memory pass-through function. A specific type of the high-speed interconnect network 22 is not limited in the present application.

The cache 102 is configured to temporarily store data received from the host 20 or data read from the hard disk 22. When receiving a plurality of data write requests sent by the host, the controller 11 may temporarily store, in the cache 102, data in the plurality of data write requests. When a capacity of the cache 102 reaches a threshold, data stored in the cache 102 is sent to the hard disk 22. The hard disk 22 stores the data. The cache 102 includes a volatile memory, a nonvolatile memory, or a combination thereof. The volatile memory may be, for example, a random-access memory (RAM). The nonvolatile memory may be, for example, a floppy disk, a hard disk, a solid-state drive (solid state disk, SSD), an optical disc, or other various machine readable/writable media that can store program code. Space of the cache 102 may be divided into a plurality of logical blocks (chunks), and the logical blocks have a same size. In some embodiments, that the size of a logical block is 128 KB is used as an example, and each logical block has a logical address (address for short in some places). When the controller 11 receives a data read request, the data read request includes a logical address of to-be-accessed data, and a logical block corresponding to the data read request may be determined based on the logical address. If the determined logical block stores the data, it indicates that the data read request is hit. If the determined logical block does not store the data, it indicates that the data read request is not hit, and the controller 11 needs to read the data from the hard disk 22, writes the data to the logical block, and then returns the data to the host 20.

It may be understood that, a speed at which data is read from the cache 102 is higher than a speed at which data is read from the hard disk 22. Therefore, if the to-be-accessed data of the data read request is hit in the cache 102, it is unnecessary to read the data from the hard disk 22. This improves data reading efficiency. To improve a data hit ratio of the cache, a piece of data (for example, data 104 shown in FIG. 1) may be pre-read from the hard disk 22 and written to the cache 102. In this case, when the host 20 sends a data read request to the controller 11 to request to read the data 104, because the data 104 is pre-read and stored in the cache 102, the processor 101 can directly send the data 104 to the host 20.

It should be noted that the foregoing description is only one implementation of this embodiment. In this implementation, the cache 102 is located inside the controller 11, and the hard disk 22 is located in persistent storage in a disk enclosure coupled to the controller 11. Data prefetching means that data in the hard disk 22 is read in advance into the cache 102 for reading by the host. In another implementation, the controller 11 includes two levels of memories. A level-1 memory is referred to as a CPU cache (cache memory), and is temporary storage closest to the processor 101, and a level-2 memory is usually directly referred to as a memory. The level-2 memory has a lower speed and a larger capacity relative to the level-1 memory. Data in the level-1 memory is a small part of data in the level-2 memory. However, this small part of data is to be accessed by a CPU in a short time. When the CPU invokes a large amount of data, the CPU may directly invoke the data from the level-1 memory instead of the level-2 memory, to speed up the reading speed. In this implementation, the data prefetching may mean that the data in the hard disk 22 is read into the level-2 memory in advance, or may mean that data in the level-2 memory is read into the level-1 memory in advance.

In addition, this embodiment may be further applied to a disk enclosure, and the disk enclosure includes a processing chip, an AI chip, a memory, and a hard disk 22. The memory inside the disk enclosure is a temporary storage closest to the processing chip, a data processing speed of the temporary storage is higher than that of the hard disk 22, and a capacity of the temporary storage is smaller than that of the hard disk 22. In this implementation, the data prefetching may mean that the data in the hard disk 22 is read into the memory inside the disk enclosure in advance.

In conclusion, this embodiment may be applied to any application scenario that includes two levels of storage. "Level-1 storage" refers to storage that has a smaller capacity and a higher data processing speed, for example, the cache 102, the level-1 memory, the level-2 memory, or the memory in the disk enclosure described above. "Level-2 storage" refers to storage that has a larger capacity and a lower data processing speed relative to the level-1 storage, for example, the level-2 memory or the hard disk 22 described above. For ease of description, that data is prefetched from the hard disk 22 into the cache 102 is still used as an example for description. It may be understood that, in another application scenario or architecture, a data prefetching method described above is still applicable.

A prefetching algorithm, also referred to as a prefetching model, is one of the factors that control a prefetching operation. If the prefetching model is improper, a larger amount or a smaller amount of data than an ideal level may be prefetched. A larger amount of prefetched data may result in a waste of cache resources. A smaller amount of prefetched data leads to low prefetching efficiency. Therefore, a solution is to input a large quantity of data samples, train the data samples to obtain a proper prefetching model, and perform a data prefetching operation based on the prefetching model.

If the processor 101 fully relies on training the data samples, the computing power of the processor 101 is inevitably insufficient. In some embodiments, an AI chip 105 is used to train the data samples and output the prefetching model for use by the processor 101.

The following describes another data prefetching method provided in this application.

Figure 2:
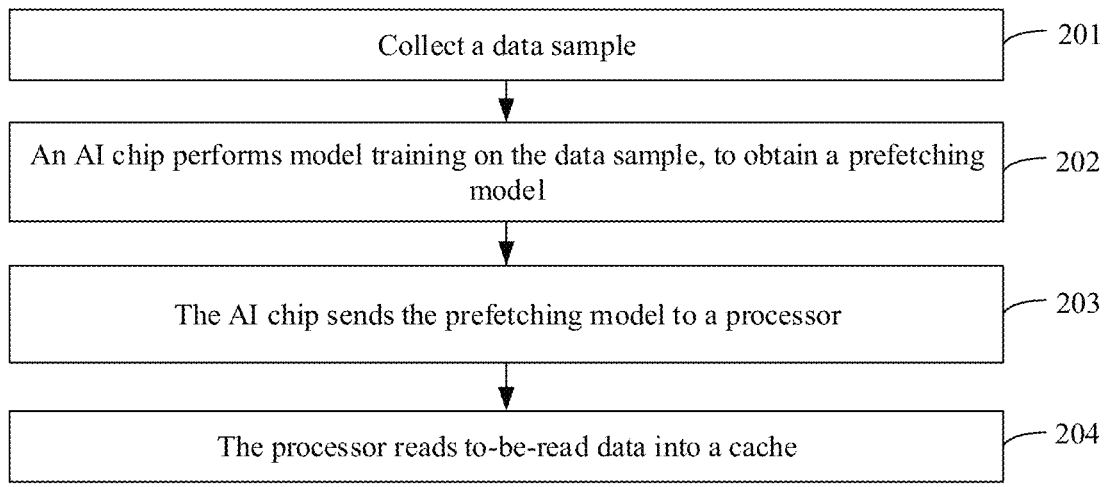
FIG. 2 is a flowchart of a data prefetching method according to an embodiment of this application.

FIG. 2 is a flowchart of a data prefetching method according to an embodiment of this application. The method may be applied to a storage device, and the storage device may be a device integrating the controller 11 and the hard disk 03 shown in FIG. 1. As shown in FIG. 2, the method includes the following steps.

Step 201: A processor 101 collects a data sample. The controller 11 receives a data writing request sent by a host 20 or another external device, where the data writing request carries data and an address of the data. The processor 101 temporarily stores the received data writing request in a cache 102. When a capacity of the cache 102 reaches a specific threshold, a data sample stored in the cache 102 is sent to the hard disk 22 for persistent storage. Therefore, the processor 101 may extract data and some attribute information of the data, such as the timestamp and the size, from a large quantity of data writing requests as a data sample. In another implementation, an AI chip 105 may be configured to extract data and attribute information.

Step 202: The AI chip 105 obtains the data sample from the cache 102 or the hard disk 22 to perform model training, to obtain a prefetching model. These prefetching models include but are not limited to serial sequential stream models, parallel sequential stream models, or spaced sequential stream models.

Step 203: The AI chip 105 sends the prefetching model to the processor 101, and the processor 101 performs inference based on the prefetching model to obtain an address of to-be-read data. The to-be-read data herein refers to data that is predicted to be read soon. In this case, the storage device has not received a data read request for reading this to-be-read data.

According to the foregoing description, the controller 11 receives one or more data read requests sent by the host 20. Each data read request carries an address of to-be-accessed data, for example, a logical block start address (LBA) and a length. The controller 11 usually predicts, based on the address of the to-be-accessed data, data of addresses to be read next time. In some embodiments, the processor 101 may predict the to-be-read data based on the addresses carried in the data read requests and the prefetching model obtained by the AI chip 105 through training. Specifically, the processor 101 may use an address of a received data read request as an input, and output the address of the to-be-read data based on the prefetching model.

Step 204: The processor 101 reads the to-be-read data from the hard disk into the cache 102.

The processor 101 reads the to-be-read data from the hard disk based on the address obtained in step 203 and stores the to-be-read data in the cache 102. The data may be read by a subsequent data read request.

In another implementation, after obtaining the prefetching model, the AI chip 105 may perform inference and send an inference result, namely, the address of the to-be-read data, to the processor 101; and the processor 101 prefetches the to-be-read data based on the address. Specifically, the address carried in the received data read request is stored in the cache 102 or the hard disk 22, and the AI chip 105 may obtain the address from the cache 102 or the hard disk 22, and use the address as an input to output the address of the to-be-read data based on the prefetching model. Then, the AI chip 105 sends the output address to the processor 101, and the processor 101 reads the to-be-read data from the hard disk into the cache 102 based on the address.

In addition, the AI chip 105 may further periodically upgrade the prefetching model, for example, re-obtain a data sample for training. Alternatively, only an existing prefetching model is modified or deleted without obtaining a data sample again.

The following describes an example prefetching model. The granularity of data prefetching is assumed to be a logical block. In some embodiments of this application, it is assumed that a received data read request is used to read a logical block A, and the AI chip 105 computes an association degree between each pair of logical blocks by using a conditional probability. A logical block B in remaining logical blocks is used as an example. The AI chip 105 may compute an association degree between the logical block B and a first logical block (referred to as the logical block A in the following formula) by using the following formula:

$$P(B|A) = \frac{f_1}{f_2},$$

where $P(B|A)$ is the association degree between the logical block A and the logical block B, namely, a probability of reading data in the logical block B after data in the logical block A is read. $f_1$ is a quantity of requests for reading the logical block B that are received in a preset time period t after a request for reading the logical block A. $f_2$ is a total quantity of requests received in the preset time period t after the request for reading the logical block A.

It should be noted that $f_1$ and $f_2$ may be obtained by collecting statistics based on a plurality of historical data read requests received and processed by the AI chip 105. For example, the storage device may obtain historical information of a plurality of historical data read requests received in a time period T before a current moment. The historical information may include information such as a logical block identifier of a logical block in which data read by a corresponding request is located, and receiving time of each request. After obtaining the historical information, the AI chip 105 may collect statistics on the historical information of the plurality of historical data read requests. For example, when the preset time period t is short, and the preset time period t includes only one request, the AI chip 105 may search for a request for reading the logical block B from the plurality of requests based on the historical information, and collect statistics on a quantity of requests for reading the logical block A as previous requests in the found requests. The obtained quantity is used as $f_1$. Similarly, the AI chip 105 may collect statistics on a quantity of historical data read requests for reading the logic block A in the plurality of historical data read requests, and the quantity is used as $f_2$.

For example, it is assumed that the storage device receives 20 historical data read requests in the time period T before the current moment. Logical blocks read corresponding to the 20 historical data read requests are A→B→C→A→E→F→C→D→S→G→B→A→E-→F→A→B→C→F→G→S in sequence. On this basis, the AI chip 105 may collect statistics on a quantity of requests for reading the logical block B that are next requests of the requests for reading the logical block A in the 20 requests. There are two requests in total, and in this case, $f_1$=2. The AI chip 105 collects statistics on the quantity of the requests for reading the logical block A in the 20 requests. There are four requests in total, and in this case, $f_2$=4. It can be learned from this that P(B|A)=2/4.

Optionally, in some embodiments of this application, when a quantity of requests received in a preset time period after each request for reading the logic block A is not equal, the AI chip 105 may determine a quantity of data read requests for reading the logical block B received in a preset time period t after each data read request for reading the logical block A, calculate a sum of these quantities, and use the sum as $f_1$. A sum of all quantities of requests received in the preset time period t after each data read request for reading the logical block A is counted and is used as $f_2$.

For example, it is assumed that three requests for reading the logical block A and five requests for reading the logical block B are received in total in the time period T before the current moment. In a first preset time period from a time point at which a first request for reading the logical block A is received, two requests are received in total, where there is one request for reading the logical block B. In a second preset time period from a time point at which a second request for reading the logical block A is received, one data read request is received in total, and no request for reading the logical block B exists. In a third preset time period from a time point at which a third request for reading the logical block A is received, three data read requests are received in total, where there is one request for reading the logical block B. It can be learned from this that a total quantity of requests for reading the logical block B received in the three preset time periods after the three requests for reading the logical block A is 2, that is, $f_1=2$. A total quantity of all the requests received in the three preset time periods is 6, that is $f_2=6$, and therefore, $P(B|A)=2/6$.

The foregoing examples are only methods for computing an association degree between each logical block and the logical block A as embodiments of this application. Optionally, the storage device may also compute an association degree between each logical block and the first logical block by using another set algorithm or model, for example, any one of a conditional probability algorithm, a Bayesian algorithm, a convolutional neural network algorithm, a long or short-term memory network algorithm, a neural network algorithm, a cyclic neural network algorithm, or a probabilistic graphical model algorithm. It should be noted that, before any one of the foregoing algorithms is used to compute an association degree between two logical blocks, the AI chip 105 may train the algorithm based on historical information of a plurality of historical data read requests received and processed in a time period T, so that an association degree between two logical blocks may be computed subsequently based on a trained model.

After the association degree between each logical block and the logical block A is computed, the storage device may use a logical block whose association degree exceeds a set association threshold as a to-be-read logical block. It should be noted that, there may be one or more logical blocks whose association degree exceeds the set association threshold. In other words, in some embodiments of this application, there may be one or more selected to-be-read logical blocks that are associated with the logical block A.

It should be noted that the set association threshold may be set by a user during initialization. In addition, in an embodiment of this application, the AI chip 105 or the processor 101 may further adjust the set association threshold at intervals based on the performance of the AI chip 105 or the processor 101.

For example, the storage device may collect statistics on a hit rate of data prefetched to the cache in a time period $t_1$, and collect statistics on a waste rate of the data prefetched to the cache in the time period $t_1$. A ratio of the hit rate to the waste rate is calculated to obtain a first ratio. A set ratio range may be stored in the storage device. The first ratio is compared with the ratio range. If the first ratio is within the ratio range, it is considered that the hit rate and the waste rate meet a requirement. In this case, the current association threshold may be kept unchanged. If the first ratio is less than a lower limit of the ratio range, it indicates that the current hit rate is low, and the waste rate is high. In this case, the storage device may increase the current association threshold. If the first ratio is greater than an upper limit of the ratio range, it indicates that the current hit rate is high. In this case, the storage device may decrease the current association threshold. After the association threshold is adjusted, the storage device may continue to collect statistics on a hit rate and a waste rate in a time period $t_1$ from the completion of adjustment, and continue to determine, by using the foregoing method, whether to continue to adjust the adjusted association threshold, so that the association threshold may be within the ratio range as much as possible. In this way, the balance of a system yield rate is maintained.

Figure 3:
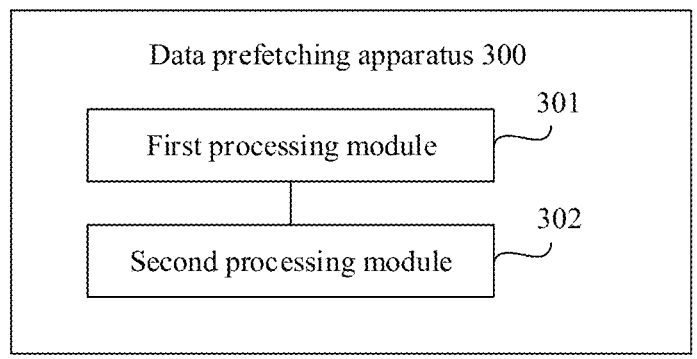
FIG. 3 is a schematic diagram of a structure of a data prefetching apparatus according to an embodiment of this application.

The following describes a data prefetching apparatus 300 according to an embodiment of this application. FIG. 3 is a schematic diagram of a structure of the apparatus. The apparatus is located in the foregoing storage device, and the storage device includes a cache 102 and a hard disk 22. The apparatus includes a first processing module 301 and a second processing module 301. The first processing module 301 is configured to train a data sample to generate a prefetching model and send the generated prefetching model to the second processing module. The second processing module 302 is configured to predict to-be-read data based on the prefetching model, where the to-be-read data is stored in the hard disk, and read the to-be-read data from the hard disk into the cache.

In addition, in another implementation, the data prefetching apparatus 300 may be located in a terminal device, for example, a mobile phone. The terminal device includes a level-1 storage and a level-2 storage. A processing speed of the level-1 storage is higher than that of the level-2 storage, but a capacity of the level-1 storage is smaller than that of the level-2 storage. In the terminal device, data in the level-2 storage also needs to be prefetched into the level-1 storage, to improve a cache hit ratio. Therefore, the data prefetching apparatus 300 is provided with the first processing module 301 and the second processing module 302 that are shown in FIG. 3. The first processing module 301 generates the prefetching model, and the second processing module 302 performs data prefetching, thereby reducing a computing burden of the second processing module 302.

In actual application, the first processing module 301 may be the AI chip 105 shown in FIG. 1, and is configured to perform the steps performed by the AI chip 105 shown in FIG. 2. The second processing module 302 may be the processor 101 shown in FIG. 1, and is configured to perform the steps performed by the processor 101 shown in FIG. 2.

In addition, the first processing module 301 may alternatively be another chip or apparatus that has a computing power in addition to a central processing unit, for example, an accelerator card, a coprocessor, a graphics processing unit (GPU), or a neural-network processor (NPU).

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer instructions are loaded and executed on a computer, the procedure or functions according to embodiments of the present disclosure are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A data prefetching method, wherein the method is applied to a storage device, the storage device comprises a processor, an artificial intelligence (AI) chip, a level-1 storage, and a level-2 storage, and the method comprises:
   generating, by the AI chip, a prefetching model, wherein the prefetching model uses data that is currently being requested as input and outputs an address of data that will likely be read next;
   sending, by the AI chip, the generated prefetching model to the processor;
   predicting, by the processor, based on the prefetching model and in response to a received data read request, an address of to-be-read data; and
   when the to-be-read data is stored in the level-2 storage, reading, by the processor, the to-be-read data from the level-2 storage into the level-1 storage using the predicted address, wherein a processing speed of the level-1 storage is higher than a processing speed of the level-2 storage, and a capacity of the level-1 storage is smaller than a capacity of the level-2 storage.

2. The method according to claim 1, wherein the predicting, by the processor, to-be-read data based on the prefetching model comprises: performing inference based on the prefetching model to obtain an address of the predicted to-be-read data.

3. The method according to claim 1, wherein the method further comprises: periodically upgrading, by the AI chip, the prefetching model.

4. The method according to claim 1, wherein the prefetching model comprises a serial sequential stream model, a parallel sequential stream model, a spaced sequential stream model, or an associated prefetching model.

5. A data prefetching method, wherein the method is applied to a storage device, the storage device comprises a processor, an artificial intelligence (AI) chip, a level-1 storage, and a level-2 storage, and the method comprises:
   generating, by the AI chip, a prefetching model, wherein the prefetching model uses data that is currently being requested as input and outputs an address of data that will likely be read next;
   performing, by the AI chip, inference based on the prefetching model, association degrees between data that are read in historical data read requests, and a received data read request to obtain an address of to-be-read data;
   sending, by the AI chip, the address of the to-be-read data to the processor; and
   reading, by the processor, the to-be-read data from the level-2 storage into the level-1 storage based on the address of the to-be-read data, wherein a processing speed of the level-1 storage is higher than a processing speed of the level-2 storage, and a capacity of the level-1 storage is smaller than a capacity of the level-2 storage.

6. The method according to claim 5, wherein the method further comprises: periodically upgrading, by the AI chip, the prefetching model.

7. The method according to claim 5, wherein the prefetching model comprises a serial sequential stream model, a parallel sequential stream model, a spaced sequential stream model, or an associated prefetching model.

8. A storage device, wherein the storage device comprises a processor, an artificial intelligence (AI) chip, a level-1 storage, and a level-2 storage;
   the AI chip is configured to generate a prefetching model and send the generated prefetching model to the processor, wherein the prefetching model uses data that is currently being requested as input and outputs an address of data that will likely be read next; and
   the processor is configured to: predict an address of to-be-read data based on the prefetching model and in response to a received data read request, wherein the to-be-read data is stored in the level-2 storage; and read the to-be-read data from the level-2 storage into the level-2 storage, wherein a processing speed of the level-1 storage is higher than a processing speed of the level-1 storage, and a capacity of the level-1 storage is smaller than a capacity of the level-2 storage.

9. The storage device according to claim 8, wherein the processor is configured to perform inference based on the prefetching model and a received data read request to obtain an address of the predicted to-be-read data.

10. The storage device according to claim 8, wherein the AI chip is further configured to periodically upgrade the prefetching model.

11. The storage device according to claim 8, wherein the prefetching model comprises a serial sequential stream model, a parallel sequential stream model, a spaced sequential stream model, or an associated prefetching model.

12. A storage device, wherein the storage device comprises a processor, an artificial intelligence (AI) chip, a level-1 storage, and a level-2 storage;
   the AI chip is configured to: generate a prefetching model, wherein the prefetching model uses data that is currently being requested as input and outputs an address of data that will likely be read next; perform inference based on the prefetching model association degrees between data that are read in historical data read requests, and in response to a received data read request, to obtain an address of to-be-read data; and send the address of the to-be-read data to the processor; and
   the processor is configured to read the to-be-read data from the level-2 storage into the level-1 storage based on the address of the to-be-read data, wherein a processing speed of the level-1 storage is higher than a processing speed of the level-2 storage, and a capacity of the level-1 storage is smaller than a capacity of the level-2 storage.

13. The storage device according to claim 12, wherein the AI chip is further configured to periodically upgrade the prefetching model.

14. The storage device according to claim 12, wherein the prefetching model comprises a serial sequential stream model, a parallel sequential stream model, a spaced sequential stream model, or an associated prefetching model.

* * * * *

UNITED STATES PATENT AND TRADEMARK OFFICE
CERTIFICATE OF CORRECTION

PATENT NO. : 12,135,648 B2
APPLICATION NO. : 17/951424
DATED : November 5, 2024
INVENTOR(S) : Peng Lu et al.

Page 1 of 1

It is certified that error appears in the above-identified patent and that said Letters Patent is hereby corrected as shown below:

In the Claims

In Column 12, Claim 8, Line 27, delete "level-2" and insert -- level-1 --.

In Column 12, Claim 8, Line 29, delete "level-1" and insert -- level-2 --.

In Column 12, Claim 12, Line 50, delete "model association" and insert -- model and association --.

Signed and Sealed this
Fourth Day of February, 2025

Coke Morgan Stewart
*Acting Director of the United States Patent and Trademark Office*